Patented May 6, 1930

1,757,372

UNITED STATES PATENT OFFICE

HEINRICH KRIEGSHEIM, OF NEW YORK, AND WILLIAM VAUGHAN, OF BROOKLYN, NEW YORK, ASSIGNORS TO THE PERMUTIT COMPANY, OF NEW YORK, N. Y., A CORPORATION OF DELAWARE

WATER-PURIFYING MATERIAL AND PROCESS OF MAKING THE SAME

No Drawing.   Application filed September 19, 1922.   Serial No. 589,276.

This invention relates to water purifying materials and process of making the same; and it comprises a method of improving glauconite for use in softening water wherein glauconite is treated with a solution of sodium silicate followed by an acid reacting solution, such as a solution of aluminum sulfate or of an acid; and it further comprises as a new material for softening and purifying water, a granular aggregate of substantially the same physical appearance as glauconite but differing therefrom in being of higher exchange power, harder and more permanent consistency and a somewhat changed analysis, the amount of silica and combined water being somewhat higher and that of calcium and phosphoric acid lower; all as more fully hereinafter set forth and as claimed.

Glauconite is the characteristic material of the "greensand marls", found in extensive deposits in New Jersey, Maryland, Virginia, etc. The greensand marls carry other minerals and the glauconite granules themselves are not of a pure character. They always carry other minerals to a greater or less extent. Glauconite is a hydrated double silicate containing iron and potash; and as it occurs in nature, it is in small green granules, probably of cryptocrystalline character. It is used for softening and purifying water in a way analogous to that in which various exchange silicates and natural or artificial zeolites (such as, for example, the hydrated double silicates of aluminum and sodium) are used. For certain purposes, it possesses distinct advantages, as in treating slightly acid waters, hot water, etc. Its relative heaviness is an advantage in treating water from which air is released in warming; and in backwashing; particularly when the impurities to be removed by backwashing are of high specific gravity; high enough to render it difficult to separate them from light zeolites.

As regards its physical properties however, glauconite in its natural state leaves something to be desired. In a granular water softening bed it is desirable that the granules be hard, rigid and little subject to disintegration since the ordinary routine of operation in softening, backwashing, regenerating, etc., involves a considerable amount of relative movement of the granules and of friction. The granules should preserve their size and shape as nearly as may be. Glauconite in its natural condition is however sometimes subject to disentegration and in the apparatus tends to develop fines or "mud", stopping or impeding circulation. And for a time after a bed of fresh glauconite in its natural condition has been put into operation, there may be a tendency for the softened water to carry a slight greenish turbidity.

In the present invention we have devised a way of materially improving the physical properties of glauconite without injuring its exchange powers; such exchange powers being indeed usually materially improved. In our procedure, we treat the glauconite with a solution containing sodium silicate ("water glass" or "silicate of soda"). The glauconite so treated may, or may not, have been submitted to a prior purification. The nature of the action exercised by the sodium silicate is not as yet clear; whatever this action may be, the results are advantageous. The treatment with sodium silicate may be performed in various specifically different ways.

In one such way, the glauconite is exposed to the action of a solution of sodium silicate or commercial "liquid water glass" in a more or less dilute state. A dilution as low as 1° Baumé and even lower may be employed, although solutions of considerably greater concentration may at times be advantageously employed. The most advantageous concentration to be employed depends on circumstances. With weak solutions, there is no risk of an undesired cementing action taking place and the treatment herein described may, if so desired, take place in the softener itself; in the apparatus in which the glauconite is to be used. Stronger solutions of course react more readily and energetically and are, for this reason and also because of the lessening in bulk, sometimes more advantageous for factory work.

After the treatment with sodium silicate, the granules may be exposed to the action of a solution of aluminum sulfate; or they may be treated with a solution of an acid; the amount of actual acid present in the solution being about that which corresponds to the sodium present in the granules and in any adhering film of silicate solution, after the silicate treatment. In the use of aluminum sulfate, solutions of various concentrations may be employed; the particular strength employed varying with circumstances. Ordinarily, we use solutions somewhere between 1° and 10° Baumé in strength; weaker solutions, as before, being advantageous in treatments effected in the softener itself and stronger solutions in factory practice. In lieu of aluminum sulfate solution other acid reacting solutions, such as a solution of ferric chlorid, may be used. If mineral acids, such as hydrochloric or sulfuric acid, are used, concentrations up to, say, 2 per cent may be employed. With organic acids, such as acetic acid, somewhat stronger solutions may be used. The mixture of dilute sodium silicate solution and acid solution mixed together outside of small zeolite plants and then passed through the zeolites has also produced the desired result.

In another mode of treatment, the glauconite, which may be in a raw condition, is mixed with a rather strong solution of sodium silicate, say, 20° to 40° Baumé, and is then dried, advantageously at a rather high temperature. This results in a hard mass which is crushed to a suitable size and washed with aluminum sulfate solution. It is a useful expedient to intercalate a treatment with a neutral salt solution, such as a calcium chlorid solution, of, say, about 5 per cent strength for half-an-hour after drying the material and before treating with the aluminum sulfate solution.

In the modification of our invention just described, the glauconite granules are cemented together to a greater or less extent, and the granules obtained on comminution of the lumpy product may be of such size as may be desired. The method is useful in treating unduly fine glauconite and, moreover, produces an excellent product of good hardness and exchange power. Instead of the calcium chlorid mentioned, many other saline materials may be employed. We have successfully used calcium sulfate, sodium sulfate, sodium nitrate, sodium bicarbonate and other salts. As to the chemical or physical action exercised by the salines upon the dried mass of glauconite and sodium silicate, we express no opinion; merely noting that the action is a useful one. Calcium chlorid appears to be the most suitable saline.

Crude glauconite as it comes from the source is frequently a very dirty material; and in such a case it is advantageous to give it various preliminary purifying treatments prior to the practice of the present invention. It may be purified by the usual mechanical or magnetic treatments, or sized and screened in a wet or dry condition. In many cases, it is desirable to use in addition to, or in lieu of, these purifying treatments a special method of purification described and claimed in our application Serial No. 547,342, now Patent 1,538,247. In using this method of purification, the granular glauconite is placed in a bed and washed with water, using an upward flow; the flow being advantageously at the rate of about a cubic foot per minute per square foot of bed. The water for washing may be rather warm, say, about 120° to 150° F. and washing is continued until the fine matter is substantially detached and displaced from the granular glauconite. Usually, the flow of wash water is continued until the effluent does not carry much muddy water, say, no more than will deposit about 10 cubic centimeters of mud from 500 cubic centimeters of wash water on standing. In this washing, a stratification of fine matter above the granular glauconite occurs. The upper layer of this fine matter, say, material passing through a 60-mesh sieve, is removed and discarded for the present purposes. It may be used as a fertilizer or as a raw material in certain methods of producing a synthetic glauconite preparation, as in the previously described method intercalating a treatment with calcium chlorid, etc. After washing the bed with water, we then pass through a solution containing an electrolyte, say, a solution of common salt. This solution may be of 10° Baumé or thereabouts and may be made slightly alkaline with caustic soda. This results in the development of further fine matter which is washed out and removed by the repetition of the treatment with water. Treatment with salt solution may be again resorted to, followed by washing with water and so on, with as many alternations as may be desired.

In a specific embodiment of our invention, clean glauconite, which may have been produced by the purifying process just described or in other ways, is exposed to the action of a solution of sodium silicate flowed through the bed. A solution of 1° Baumé is sufficiently strong for the present purposes. The sodium silicate solution is allowed to flow through the bed and is then removed by a flow of water. This flow of water may be used for preparing more silicate solution. After washing, a solution of aluminum sulfate of about 1° Baumé is passed through the bed and the bed thereafter once more washed. Instead of using acid reacting salt solutions, such as aluminum sulfate solution, a dilute mineral or organic acid, such as hydrochloric acid, sulfuric acid, nitric acid, acetic acid, lactic acid, etc., may be employed, but we regard the treatment with aluminum sulfate as more advantageous. After the treatment of the material with aluminum sulfate or dilute acid, it is advantageous to expose the glauconite to the action of a solution of common salt for a time. This places it in condition for use in softening water.

Operation with the various solutions mentioned may be at the ordinary temperature or at a somewhat higher temperature. The use of warm solution is often advantageous; and especially with the sodium silicate solution.

Granules of material prepared by the process just stated are much harder and resistant to disintegration than the natural granules; a very important advantage in the use of glauconite for softening water. In the ordinary routine of water softening operations, the bed of granular material is used for softening water, backwashed, regenerated with salt solution and the excess brine rinsed out; and these operations involve friction among the granules. The harder the granules can be made, the better; and the additional hardness given by the described process is highly advantageous. The after treatment with aluminum sulfate gives a granular product which is markedly harder than that obtained by treatment with dilute acids. For this reason, we regard the use of aluminum sulfate as more advantageous. The granules treated as described, using either aluminum sulfate or dilute acid in the final step, have a considerably enhanced exchange power over ordinary glauconite. The so-treated glauconite may take up 10 per cent more hardness-giving impurities before exhaustion than does ordinary glauconite. The treated material has no tendency to give turbidity to water.

In a specific example of this embodiment of our invention, a bed containing 10 cubic feet of raw glauconite was exposed to water and salt solution and treated in the manner described in the acknowledged prior application, Serial No. 547,342, now Patent #1,538,247. It was then treated with 0.5 gallon of commercial waterglass solution of 40° to 42° Baumé mixed with sufficient water to give a total volume of 7 gallons. After the sodium silicate solution had passed through the bed, the bed was washed slightly and was then treated with about 7 gallons of water containing a pound of commercial aluminum sulfate in solution. The particular waterglass solution used in this work contained about 7 per cent NaOH and 28 per cent $SiO_2$.

The granulated glauconite made as just stated under the microscope appeared to carry a whitish looking substance. The percentage of silicia in the material was raised somewhat as was the water of combination. The amounts of lime (CaO) and phosphoric acid ($P_2O_5$), for some reason, were lowered. The analytical results obtained with this particular sample are as follows:

|  | Washed material | Treated material |
|---|---|---|
|  | Per cent | Per cent |
| Moisture | 2.40 | 2.20 |
| Loss on ignition | 4.80 | 5.50 |
| Silica ($SiO_2$) | 46.84 | 49.44 |
| Iron and alumina ($Al_2O_3+Fe_2O_3$) | 30.60 | 30.80 |
| Calcium (CaO) | 2.38 | .38 |
| Magnesia (MgO) | 3.67 | 2.97 |
| Alkali ($Na_2O$) ($K_2O$) | 6.86 | 7.58 |
| Phosphoric anhydride ($P_2O_5$) | 1.76 | 0.86 |
| Sulfur trioxide ($SO_3$) | .69 | 0.21 |

In another specific embodiment of our invention, raw glauconite was mixed with about equal parts of the same sodium silicate solution of 20° to 40° Baumé and was then dried at a temperature of about 200° C. for about one hour. This resulted in the production of lumps of hard material. This lumpy material was crushed to a suitable size and treated with a solution of calcium chlorid of about 5 per cent strength for about half-an-hour. The material was then slightly washed with water and then with a solution of aluminum sulfate of about 1° Baumé. The material so made was very hard and had no tendency toward disintegration in water. It could be boiled with water for several hours without injury.

In this particular example, using calcium chlorid solution for the intermediate treatment and aluminum sulfate for the acid-reacting solution, a glauconite having the composition shown in the first column of figures below gave a final product such as shown in the second column. After treatment with sodium chlorid solution to prepare it for use in the water softening operation, it gave the figures in the third column.

|  | #1 | #2 | #3 |
|---|---|---|---|
|  | Per cent | Per cent | Per cent |
| Loss on ignition | 5.87 | 5.89 | 5.99 |
| Silica ($SiO_2$) | 49.18 | 55.32 | 55.84 |
| Iron and alumina ($Fe_2O_3+Al_2O_3$) | 30.54 | 24.05 | 24.84 |
| Calcium (CaO) | 1.74 | 1.87 | 1.81 |
| Magnesium (MgO) | 2.87 | 2.63 | 2.63 |
| Sodium oxid ($Na_2O$) | .99 | 3.03 | 2.88 |
| Potash ($K_2O$) | 6.24 | 5.43 | 4.74 |
| Phosphoric anhydride ($P_2O_5$) | 1.58 | 1.22 | 1.39 |

As will be noted, the proportion of silica and bases has been somewhat increased by the treatment.

What we claim is:—

1. In the improvement of glauconite as a water-softening agent the process which comprises treating glauconite granules with a solution containing dissolved alkali silicate and then with an acid-reacting solution.

2. In the improvement of glauconite as a water-softening agent the process which comprises treating glauconite granules with a solution containing dissolved sodium silicate and then with an acid-reacting solution.

3. In the improvement of glauconite as a water-softening agent the process which comprises treating glauconite granules with a solution containing dissolved alkali silicate and then with a solution containing aluminum sulfate.

4. The process of improving glauconite which comprises successively passing through a bed of such glauconite a weak solution of sodium silicate and then a weak solution of aluminum sulfate.

5. The process of improving glauconite which comprises successively passing through a bed of glauconite a weak solution of sodium silicate, a weak solution of aluminum sulfate and a solution of sodium chlorid.

6. In the improvement of glauconite the process which comprises successively treating a bed of glauconite with water and salt solution in alternation until fine and disintegrable matters are substantially removed, thereafter treating the glauconite with a weak solution of alkali silicate and with an acid-reacting solution.

7. In the improvement of glauconite the process which comprises successively treating a bed of glauconite with water and salt solution in alternation until fine and disintegrable matters are substantially removed and thereafter treating the glauconite with a weak solution of alkali silicate followed by a solution of aluminum sulfate.

8. As a material for water softening a granular aggregate of glauconite, the granules of such aggregate containing in a free state a substantially greater proportion of silica than untreated glauconite and less lime, and being of greater hardness and higher reactive power than ordinary glauconite.

9. As a material for water softening a granular aggregate of glauconite, the granules of such aggregate containing a substantially greater proportion of silica than untreated glauconite, and being of greater hardness and higher reactive power than ordinary glauconite, said glauconite having properties of material treated with a solution of sodium silicate followed by an acid reacting solution.

10. In the art of preparing materials for treatment of liquids, a process which comprises treating greensand with a solution of sodium silicate.

11. A water softening material comprising greensand which has been treated with a solution of an alkali silicate.

12. In the art of preparing glauconite materials for treatment of liquids, a process comprising the treatment of the glauconitic material with a solution of sodium silicate for a sufficient length of time to result in substantial improvement in the base exchange properties, and then washing the material to remove the excess silicate.

13. A process of preparing materials for liquid treatment which comprises indurating green-sand by the action of a solution of sodium silicate, followed by removal of uncombined silicate.

14. In the art of treating water, a process which comprises heating green-sand in a solution of an alkali-metal silicate until its composition is modified followed by removal of uncombined silicate.

15. A water softening material consisting of the solid product of the chemical combination of an alkali-metal silicate with glauconitic material.

16. A water treating material formed from green-sand and preserving the general physical characteristics thereof but with augmented cohesion and base exchange capacity.

17. A water softening material consisting of the water-insoluble reaction product of sodium silicate upon glauconitic material.

18. In a process of silicating glauconitic material, the silication step consisting in treating the glauconitic material with an alkali metal silicate solution only for a sufficient length of time to result in substantial improvement in the base exchange properties.

19. The process of preparing a base-exchange silicate which comprises treating greensand with sodium silicate and subsequently with aluminum sulfate.

In testimony whereof, we have hereunto affixed our signatures.

HEINRICH KRIEGSHEIM.
WILLIAM VAUGHAN.